(12) United States Patent
Moore

(10) Patent No.: US 7,257,492 B2
(45) Date of Patent: Aug. 14, 2007

(54) HANDLING OF STATIC CORRECTIONS IN MULTIPLE PREDICTION

(75) Inventor: Ian Moore, Trigg (AU)

(73) Assignee: WesternGeco L.L., Houston, TX (US)

( * ) Notice: Subject to any disclaimer, the term of this patent is extended or adjusted under 35 U.S.C. 154(b) by 103 days.

(21) Appl. No.: 11/213,137

(22) Filed: Aug. 26, 2005

(65) Prior Publication Data

US 2007/0073488 A1 Mar. 29, 2007

(51) Int. Cl.
*G01V 1/28* (2006.01)
(52) U.S. Cl. ...................................... 702/17
(58) Field of Classification Search ................ 702/14, 702/17, 16; 367/73
See application file for complete search history.

(56) References Cited

U.S. PATENT DOCUMENTS

| | | | |
|---|---|---|---|
| 4,380,059 A | 4/1983 | Ruehle | 376/46 |
| 4,713,775 A | 12/1987 | Scott | 706/45 |
| 4,984,220 A | 1/1991 | Bodine et al. | 367/68 |
| 4,995,007 A | 2/1991 | Corcoran et al. | 367/52 |
| 5,008,861 A | 4/1991 | Gallagher | 367/59 |
| 5,051,960 A | 9/1991 | Levin | 367/24 |
| 5,128,899 A | 7/1992 | Boyd et al. | 367/50 |
| 5,237,538 A | 8/1993 | Linville, Jr. et al. | 367/38 |
| 5,555,530 A | 9/1996 | Meehan | 367/45 |
| 5,596,547 A | 1/1997 | Bancroft et al. | 367/51 |
| 5,642,327 A | 6/1997 | Schiflett et al. | 367/47 |
| 5,661,697 A | 8/1997 | Swan et al. | 367/47 |
| 5,671,136 A | 9/1997 | Willhoit, Jr. | 702/18 |
| 5,835,452 A | 11/1998 | Mueller et al. | 367/75 |
| 5,920,828 A | 7/1999 | Norris et al. | 702/14 |
| 6,058,074 A | 5/2000 | Swan et al. | 367/38 |
| 6,161,076 A | 12/2000 | Barr et al. | 702/17 |
| 6,236,942 B1 | 5/2001 | Bush | 702/14 |
| 6,411,903 B2 | 6/2002 | Bush | 702/14 |
| 6,574,565 B1 | 6/2003 | Bush | 702/14 |
| 6,754,589 B2 | 6/2004 | Bush | 702/13 |
| 6,834,235 B2 | 12/2004 | Muijs et al. | 702/14 |
| 2005/0065758 A1 | 3/2005 | Moore | 703/10 |

FOREIGN PATENT DOCUMENTS

| | | |
|---|---|---|
| WO | PCT/US04/23119 | 7/2004 |
| WO | PCT/US04/23120 | 7/2004 |

*Primary Examiner*—Donald E McElheny, Jr.

(57) ABSTRACT

A method is for use in seismic data processing includes improving the continuity of the primary events in an original seismic dataset to create a continuous, seismic dataset; predicting at least the first order multiples of the original seismic dataset from the continuous seismic dataset; deterministically matching the predicted multiples and one of the original seismic dataset or the continuous seismic dataset; and taking the difference between the matched datasets. In other aspects, an apparatus may include a computer programmed to perform to such a method and by which the seismic data may be processed. The apparatus may also include a program storage medium encoded with instructions that, when executed by a computing device, will perform the method. The data upon which the method operates may be acquired in either a land or marine survey and may be two-dimensional, three-dimensional, or four-dimensional.

44 Claims, 11 Drawing Sheets

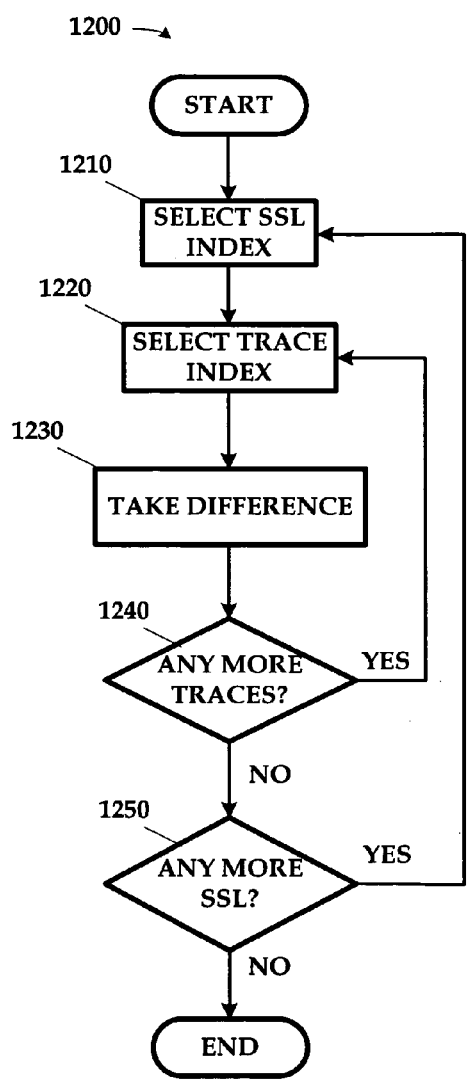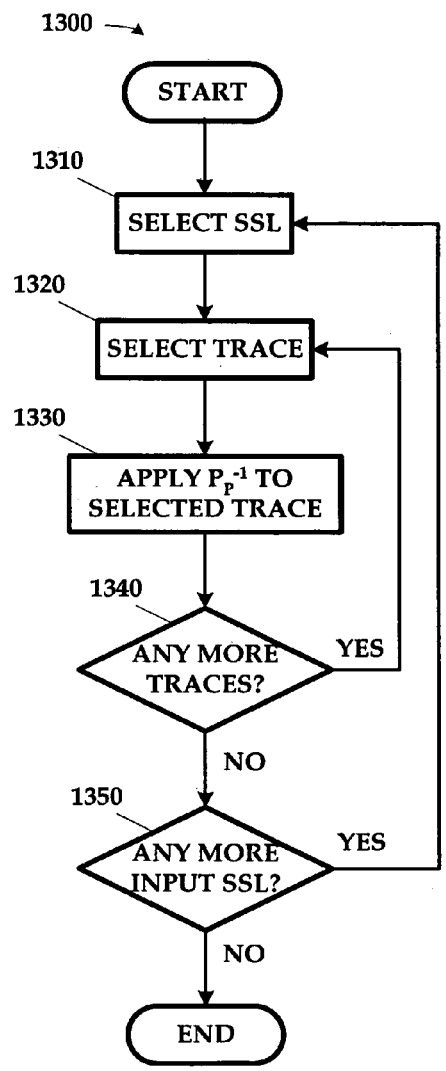
FIG. 12
FIG. 13

HANDLING OF STATIC CORRECTIONS IN MULTIPLE PREDICTION

BACKGROUND OF THE INVENTION

1. Field of the Invention

The present invention pertains to seismic data processing, and, more particularly, to a technique for handling static corrections in multiple prediction.

2. Description of the Related Art

Seismic surveying is a method for determining the structure of subterranean formations in the earth. Seismic surveying typically utilizes seismic energy sources which generate seismic waves and seismic receivers which detect seismic waves. The seismic waves propagate into the formations in the earth, where a portion of the waves reflects from interfaces between subterranean formations. The seismic receivers detect the reflected seismic waves and convert the reflected waves into representative electrical signals. The signals are typically transmitted by electrical, optical, radio or other means to devices which record the signals. Through analysis of the recorded signals (or traces), the shape, position and composition of the subterranean formations can be determined.

Marine seismic surveying is a method for determining the structure of subterranean formations underlying bodies of water. Marine seismic surveying typically utilizes seismic energy sources and seismic receivers located in the water which are either towed behind a vessel or positioned on the water bottom from a vessel. The energy source is typically an explosive device or compressed air system which generates acoustic energy, which then propagates as seismic waves through the body of water and into the earth formations below the bottom of the water. As the seismic waves strike interfaces between subterranean formations, a portion of the seismic waves reflects back through the earth and water to the seismic receivers, to be detected, transmitted, and recorded.

Seismic waves, however, reflect from interfaces other than just those between subterranean formations, as would be desired. Seismic waves also reflect from the water bottom and the water surface, and the resulting reflected waves themselves continue to reflect. Waves which reflect multiple times are called "multiples". Waves which reflect multiple times in the water layer between the water surface above and the water bottom below are called "water-bottom multiples". Water-bottom multiples have long been recognized as a problem in marine seismic processing and interpretation, so multiple attenuation methods based on the wave equation have been developed to handle water-bottom multiples. However, a larger set of multiples containing water-bottom multiples as a subset can be defined. The larger set includes multiples with upward reflections from interfaces between subterranean formations in addition to upward reflections from the water bottom. The multiples in the larger set have in common their downward reflections at the water surface and thus are called "surface multiples".

One difficulty with multiples is the effect of environmental anomalies addressed by static corrections. Often called "statics," a static correction is a bulk shift of a seismic trace in time during seismic processing to "correct" for the effects of environmental anomalies. Generally, statics are caused by structural or velocity variations in the near surface. These variations may be spatial (e.g., elevation statics) or temporal (e.g., tidal statics). In land-based surveys, common static corrections compensate for a layer of low seismic velocity material near the surface of the Earth, differences in topography, and differences in the elevations of sources and receivers. In marine surveys, common static corrections compensate for changes in tidal conditions and water velocity.

Historically, seismic surveys were conducted in two-dimensions, i.e., they were two-dimensional ("2D"). In 2D survey data processing, spatial statics may be problematical, depending on the processing technique, but temporal statics are generally not problematical because the effect of the static varies slowly with spatial location. However, seismic surveys are now increasingly being conducted in three dimensions, i.e., they are three-dimensional ("3D"). In 3D surveys, statics are a more significant issue. Statics have been commonly applied to primaries in 3D surveys, but not to multiples. For primaries, the static is usually a simple time shift. The effect of statics on multiples is fundamentally different to that for primaries. Consider the case of an $n^{th}$ order surface multiple in a surface marine survey. The raypath for this multiple passes through the region creating the static anomaly (n+1) times as often as the corresponding primary, and therefore the required static correction is of the order of (n+1) times as large. The application of statics derived for the primaries will therefore not completely correct the static problems for the multiples.

A large class of multiple prediction algorithms, (e.g., 2D SRME, 3D SRME and WEMA) predict multiples from primaries and lower-order multiples. These algorithms assume that the data are consistent with a single model, at least within each subset of the data that are processed together. When this assumption is not met because of variations in the statics, static corrections must be applied in order to make the primaries consistent. This is likely to be the case for 3D algorithms, where data from different sail lines are processed together. However, simply correcting the data for the primary statics does not solve the problem, because the statics for the multiples are different.

The present invention is directed to resolving, or at least reducing, one or all of the problems mentioned above.

SUMMARY OF THE INVENTION

The present invention, in its various aspects and embodiments, is a method and apparatus implementing a technique for handling static corrections in multiple prediction. The method is for use in seismic data processing, and comprises improving the continuity of the primary events in an original seismic dataset to create a continuous seismic dataset; predicting at least the first order multiples of the original seismic dataset from the continuous seismic dataset; deterministically matching the predicted multiples and one of the original seismic dataset or the continuous seismic dataset; and taking the difference between the matched datasets. In one embodiment, deterministically matching includes applying a multiple correction to the original seismic dataset to yield a multiple-corrected dataset; and taking the difference between the matched datasets includes taking the difference between the multiple-corrected dataset and the predicted multiples. In a second embodiment, deterministically matching includes applying the inverse of a primary correction to the predicted multiples; and taking the difference between the matched datasets includes taking the difference between the corrected multiples and the original dataset.

In other aspects, the apparatus of the invention includes a computer programmed to perform to such a method and by which the seismic data may be processed. The apparatus may also include a program storage medium encoded with instructions that, when executed by a computing device, will perform the method. The data upon which the method operates may be acquired in either a land or marine survey and may be two-dimensional, three-dimensional, or four-dimensional.

BRIEF DESCRIPTION OF THE DRAWINGS

The invention may be understood by reference to the following description taken in conjunction with the accompanying drawings, in which like reference numerals identify like elements, and in which:

FIG. 12 illustrates taking the difference on a line-by-line basis in the particular embodiment of FIG. 6A-FIG. 6B;

FIG. 13 illustrates applying the inverse of the multiple correction to the difference dataset to yield a corrected dataset on a line-by-line basis on a line-by-line basis in the particular embodiment of FIG. 6A-FIG. 6B;

DETAILED DESCRIPTION OF THE INVENTION

Figure 1:
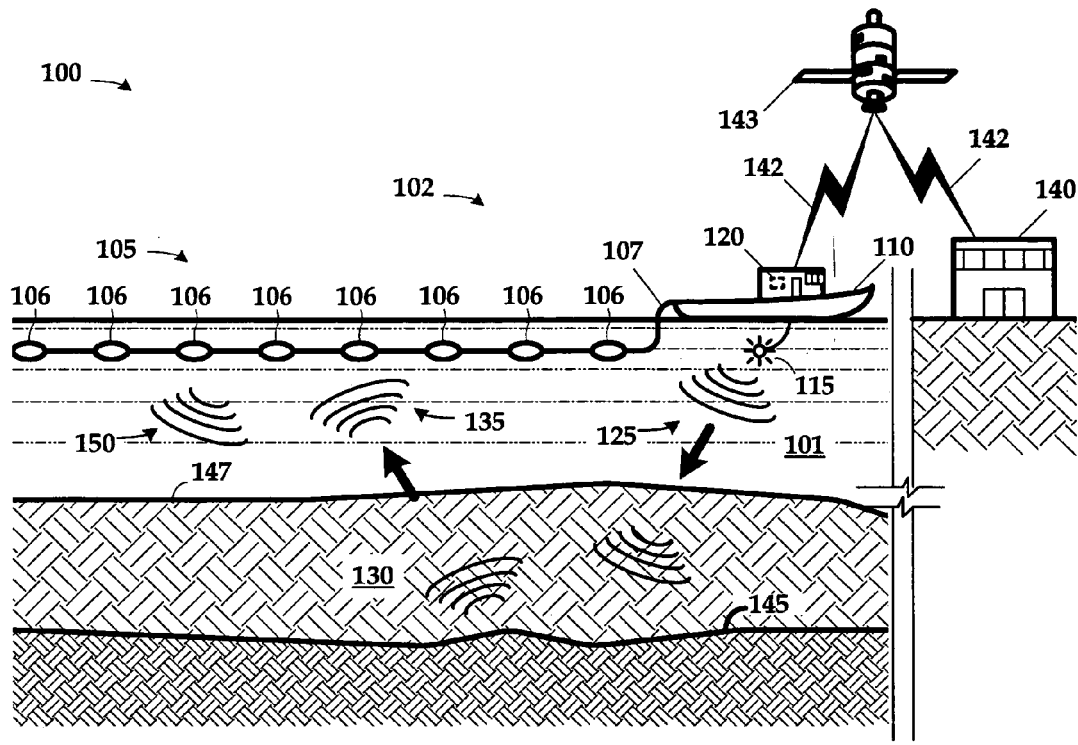
FIG. 1 depicts a marine seismic survey practiced in accordance with the present invention.
Figure 2:
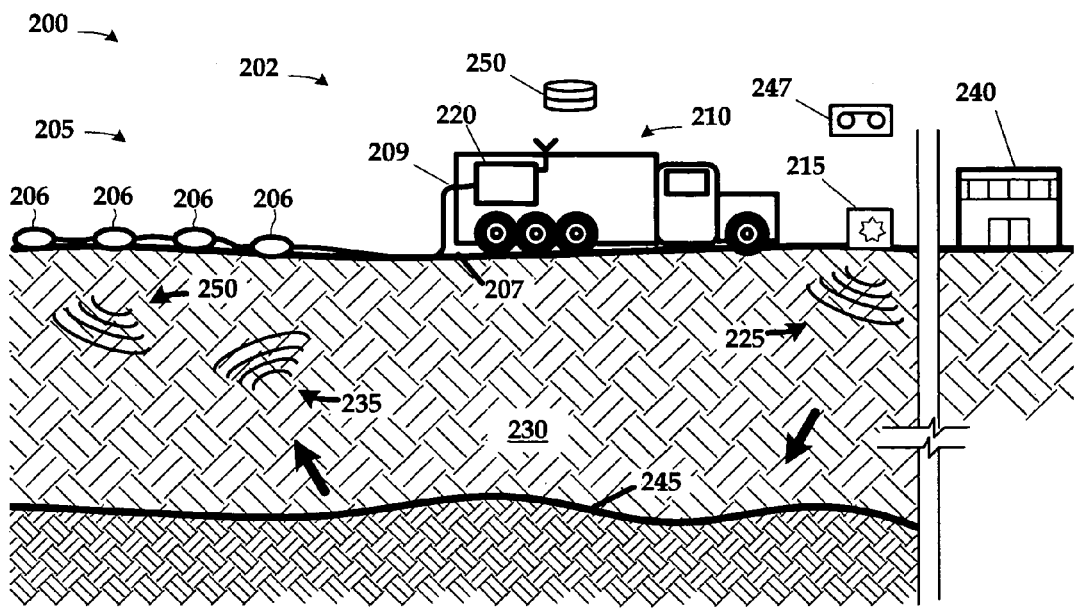
FIG. 2 depicts a land-based seismic survey practiced in accordance with the present invention.

The present invention comprises a method and apparatus for use in processing seismic data. The invention admits wide variation in the type of seismic data with which it may be used. For instance, the seismic data may be acquired though either a land-based or a marine seismic survey. FIG. 1 and FIG. 2, discussed more fully below, discuss exemplary seismic surveys by which seismic data may be acquired. In general, the present invention will yield relatively poorer results in transition zone surveys because of the behavior of the reflections, although the invention may nevertheless find application in such surveys.

Similarly, the seismic data may be two-dimensional ("2D") or three-dimensional ("3D") data. As those in the art having the benefit of this disclosure will appreciate, 2D seismic data and 3D seismic data are acquired the 2D and 3D seismic survey, respectively. Thus, the nature of the data on which the present invention is applied will be function of the survey by which it is acquired. Also as will be appreciated by those of ordinary skill in the art, whether the seismic data is 2D or 3D data will have implications in processing. However, differences in processing arising from the 2D/3D nature of the seismic data will be within the ordinary skill of those in the art having the benefit of this disclosure.

FIG. 1 illustrates an exemplary marine seismic survey 100. The marine seismic survey 100 may be conducted in virtually any body of water. Thus, in accordance with usage in the art, the term "marine" does not necessarily imply a saltwater acquisition environment. The water 101 may be saltwater, fresh water, or brackish water. The marine seismic survey 100 employs a seismic survey system 102 by which seismic data may be acquired for processing in accordance with the present invention. The seismic survey system 102 includes a seismic recording array 105 and may be constructed in accordance with conventional practice. The recording array 105 includes a plurality of receivers 106 comprising a portion of at least one seismic streamer 107. As those in the art having the benefit of this disclosure will appreciate that most embodiments will typically employ multiple seismic streamers 107 arrayed behind the survey vessel 110. The receivers 106 are implemented, in the illustrated embodiment, with, e.g., hydrophones as are known to the art.

FIG. 1 also shows a seismic source 115 and a data collection unit 120. The seismic source 115 may be a vibroseis source or an impulse source, such as explosives or an air gun, as are known in the art. Note that embodiments may employ multiple sources 115 in arrays using techniques known to the art. Those skilled in the art will realize that the embodiments illustrated herein can be extrapolated to apply the present invention to embodiments employing multiple seismic sources 115. The data collection unit 120 is centrally located on the survey vessel 110. However, as will be appreciated by those skilled in the art, various portions of the data collection unit 120 may be distributed in whole or in part, e.g., across the seismic recording array 105, in alternative embodiments.

The geological formation 130 presents a seismic reflector 145. As those in the art having the benefit of this disclosure will appreciate, geological formations under survey can be much more complex. For instance, multiple reflectors presenting multiple dipping events may be present. FIG. 1 omits these additional layers of complexity for the sake of clarity and so as not to obscure the present invention.

Still referring to FIG. 1, the seismic source 115 generates a plurality of seismic survey signals 125 in accordance with conventional practice as the survey vessel 110 tows the streamers 107 across the area to be surveyed in a predetermined pattern. The seismic survey signals 125 propagate and are reflected by the subterranean geological formation 130. The invention may nevertheless be practiced in the presence of such complexity. The receivers 106 detect the reflected signals 135 from the geological formation 130 in a conventional manner. The receivers 106 then generate data representative of the reflections 135, and the seismic data is embedded in electromagnetic signals.

The signals generated by the receivers 106 are communicated to the data collection unit 120. The data collection unit 120 collects the seismic data for processing. The data collection unit 120 may process the seismic data itself, store the seismic data for processing at a later time, transmit the seismic data to a remote location for processing, or some combination of these things. Typically, processing occurs on board the survey vessel 110 or at some later time rather than in the survey vessel 110 because of a desire to maintain production. The data may therefore be stored on a portable magnetic storage medium (not shown) or wirelessly transmitted from the survey vessel 110 to a processing center 140 for processing in accordance with the present invention. Typically, in a marine survey, this will be over satellite links 142 and a satellite 143. Note that some alternative embodiments may employ multiple data collection systems 120.

FIG. 2 illustrates an exemplary land-based seismic survey 200. The seismic survey 200 employs a seismic survey system 202 by which seismic data may be acquired for processing in accordance with the present invention. The seismic survey system 202 includes a seismic recording array 205 and may be constructed in accordance with conventional practice. The recording array 205 includes a plurality of receivers 206 positioned about an area to be surveyed on the surface 207. The receivers 206 are implemented, in the illustrated embodiment, with, e.g., geophones as are known to the art.

FIG. 2 shows a seismic source 215 and a data collection unit 220. The seismic source 115 may be a vibroseis source or an impulse source, such as explosives or an air gun, as are known in the art. Note that embodiments may employ multiple sources 215 in arrays using techniques known to the art. Those skilled in the art will realize that the embodiments illustrated herein can be extrapolated to apply the present invention to embodiments employing multiple seismic sources 115. The data collection unit 220 is centrally located on the recording truck 210. However, as will be appreciated by those skilled in the art, various portions of the data collection unit 220 may be distributed in whole or in part, e.g., across the seismic recording array 205, in alternative embodiments.

The geological formation 230 presents a seismic reflector 245. As those in the art having the benefit of this disclosure will appreciate, geological formations under survey can be much more complex. For instance, multiple reflectors presenting multiple dipping events may be present. FIG. 2 omits these additional layers of complexity for the sake of clarity and so as not to obscure the present invention.

The seismic source 215 generates a plurality of seismic survey signals 225 in accordance with conventional practice. The seismic survey signals 225 propagate and are reflected by the subterranean geological formation 230. The receivers 206 receive the reflected signals 235 from the geological formation 230 in a conventional manner. The receivers 206 then generate data representative of the reflections 235, and the seismic data is embedded in electromagnetic signals.

The signals generated by the receivers 206 are communicated to the data collection unit 220. Data collected by the receivers 206 is transmitted over the communications link 209 to a data collection unit 220 in the illustrated embodiment. Note that, in some alternative embodiments, the recording array 205 may transmit data collected by the receivers 206 over a wired connection. The data collection unit 220 collects the seismic data for processing. The data collection unit 220 may process the seismic data itself, store the seismic data for processing at a later time, transmit the seismic data to a remote location for processing, or some combination of these things. Typically, processing occurs in camp or at some later time rather than in the recording truck 210 because of a desire to maintain production. The data is therefore stored on a magnetic storage medium, such as a tape 247 or disk array 250, in the recording truck 210 by the data collection unit 220. The magnetic storage medium is then transported to a processing center 240 for processing in accordance with the present invention. Note that some alternative embodiments may employ multiple data collection systems 220.

As previously mentioned, the surveys 100, 200 in FIG. 1, FIG. 2 are exemplary only. The seismic data on which the present invention operates may be collected using practically any kind of seismic survey. For instance, the marine seismic survey 100 shown in FIG. 1 uses the streamer 107. However, some marine surveys are conducted by deploying an ocean bottom cable ("OBC", not shown) on the floor 147. The OBC will include a number of receivers 106 that receive reflections and then generate and transmit data representative of those reflections for storage and/or processing. The present invention may be employed to process seismic data acquired through such a marine survey. Note, however, that OBC applications may experience some differences relative to surface data applications, regarding the present invention, as will be appreciated by those skilled in the art having the benefit of this disclosure. For instance, for tidal statics, the primary only passes through the water layer once, but the first-order multiple passes through it three times, so there is a factor of three in the statics rather than the factor of two that is usual for data recorded at the surface.

Figure 3:
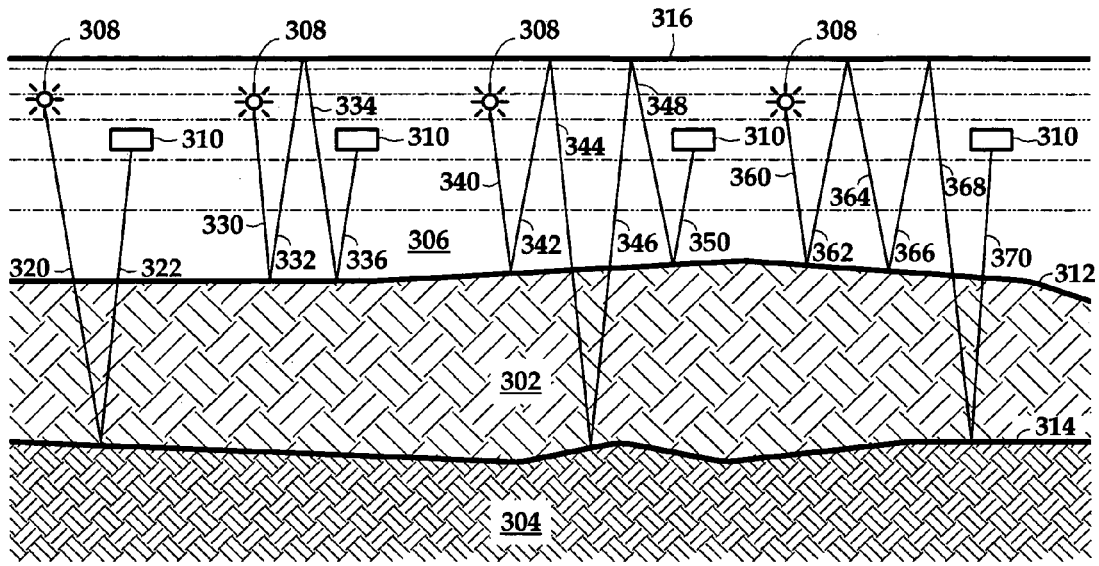
FIG. 3 conceptually illustrates the presence of multiples in a marine seismic survey.

Each of the surveys 100, 200, shown in FIG. 1, FIG. 2 will also include multiple reflections, or multiples, 150, 250. FIG. 3 provides examples of different types of reflections in a marine seismic survey. Note that multiples occur analogously in land-based surveys. A seismic source 308, such as an air gun, creates seismic waves in the body of water 306 and a portion of the seismic waves travels downward through the water toward the subterranean formations 302 and 304 beneath the body of water 306.

When the seismic waves reach a seismic reflector, a portion of the seismic waves reflects upward and a portion of the seismic waves continues downward. The seismic reflector can be the water bottom 312 or one of the interfaces between subterranean formation, such as interface 314 between formations 302 and 304. When the reflected waves traveling upward reach the water/air interface at the water surface 316, a majority portion of the waves reflects downward again. Continuing in this fashion, seismic waves can reflect multiple times between upward reflectors, such as the water bottom 312 or formation interfaces below, and the downward reflector at the water surface 316 above, as described more fully below. Each time the reflected waves propagate past the position of a seismic receiver 310, the receiver 310 senses the reflected waves and generates representative signals.

Primary reflections are those seismic waves which have reflected only once, from the water bottom 312 or an interface between subterranean formations, before being detected by a seismic receiver 310. An example of a primary reflection is shown in FIG. 3 by raypaths 320 and 322. Primary reflections contain the desired information about the subterranean formations which is the goal of marine seismic surveying.

Surface multiples are those waves which have reflected multiple times between the water surface 316 and any upward reflectors, such as the water bottom 312 or formation interfaces, before being sensed by a receiver 310. An example of a surface multiple which is specifically a water bottom multiple is shown by raypaths 330, 332, 334 and 336. The points on the water surface 316 at which the wave is reflected downward are generally referred to as the downward reflection points. The surface multiple starting at raypath 330 is a multiple of order one, since the multiple contains one reflection from the water surface 316.

Two examples of general surface multiples with upward reflections from both the water bottom 312 and formation interfaces are shown by raypaths 340, 342, 344, 346, 348 and 350 and by raypaths 360, 362, 364, 366, 368 and 370. Both of these latter two examples of surface multiples are multiples of order two, since the multiples contain two reflections from the water surface 316. In general, a surface multiple is of order n if the multiple contains n reflections from the water surface 316. Surface multiples are extraneous noise which obscures the desired primary reflection signal.

Thus, seismic data acquired through the seismic surveys 100, 200 in FIG. 1, FIG. 2, will include at least first order multiples such as are shown in FIG. 3. Note that some surveys might not produce higher order surface multiples in the seismic data. For instance, in some deep water marine surveys, higher order multiples may take too long to reach the relevant receivers to arrive within the acquisition time window for the survey. They will therefore be excluded from the seismic data. They seismic data, once acquired, is then processed in accordance with the present invention on a computing apparatus. Typically, the seismic data is stored on-site and then transmitted/transported to a central processing facility as discussed above. However, in some embodiments, the seismic data may be processed on-site (or even real-time) or archived prior to processing. In some cases where the seismic data is archived, it may even be archived over a period of years.

Figure 4:
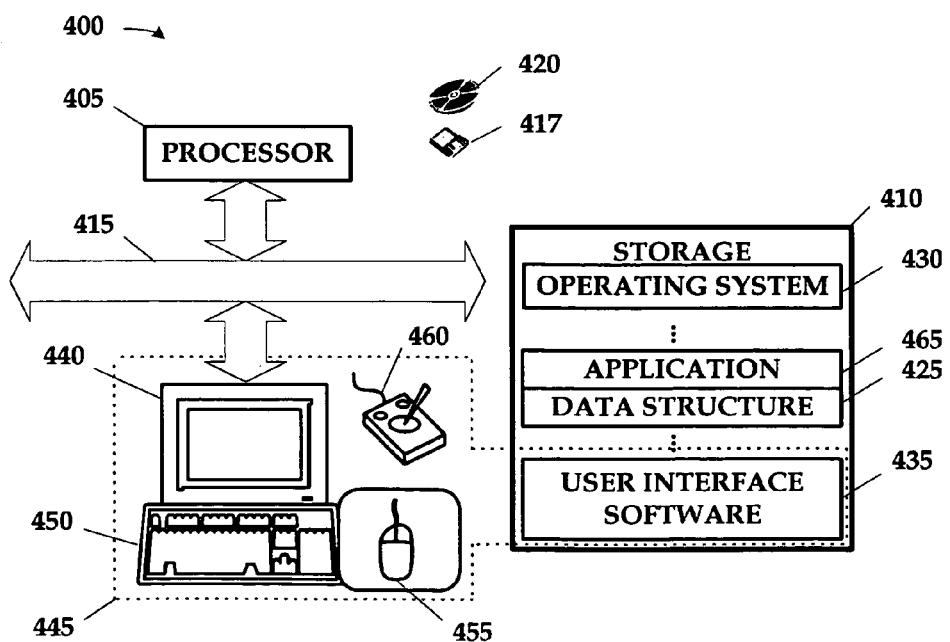
FIG. 4 show selected portions of the hardware and software architecture of a computing apparatus such as may be employed in some aspects of the present invention.

FIG. 4 show selected portions of the hardware and software architecture of a computing apparatus 400 such as may be employed in some aspects of the present invention. The computing apparatus 400 includes a processor 405 communicating with storage 410 over a bus system 415. The storage 410 may include a hard disk and/or random access memory ("RAM") and/or removable storage such as a floppy magnetic disk 417 and an optical disk 420. The storage 410 is encoded with a data structure 425 storing the data set acquired as discussed above, an operating system 430, user interface software 435, and an application 465. The user interface software 435, in conjunction with a display 440, implements a user interface 445. The user interface 445 may include peripheral I/O devices such as a keypad or keyboard 450, a mouse 455, or a joystick 460. The processor 405 runs under the control of the operating system 430, which may be practically any operating system known to the art. The application 465 is invoked by the operating system 430 upon power up, reset, or both, depending on the implementation of the operating system 430.

The seismic data set acquired as discussed above relative to FIG. 1 and/or FIG. 2 is stored in the data structure 425, shown in FIG. 4. The application 465, when invoked performs a method 500 for use in processing seismic data, shown in FIG. 5A-FIG. 5B. The user may invoke the application in conventional fashion through the user interface 445.

Figure 5A:
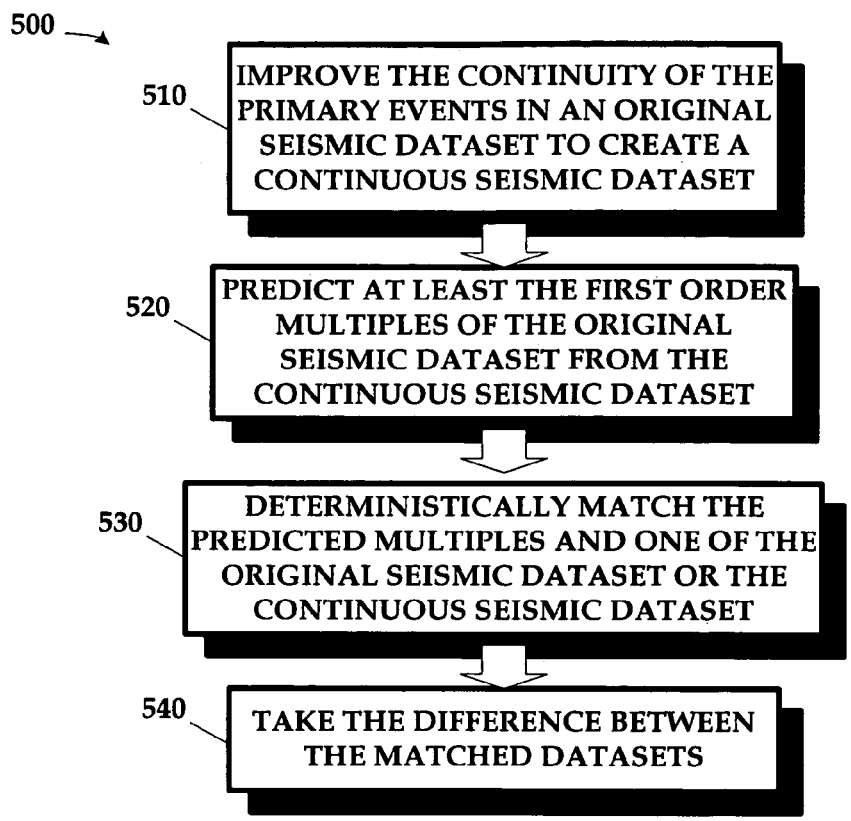
FIG. 5A-FIG. 5B show a method practiced in accordance with the present invention.
Figure 5B:
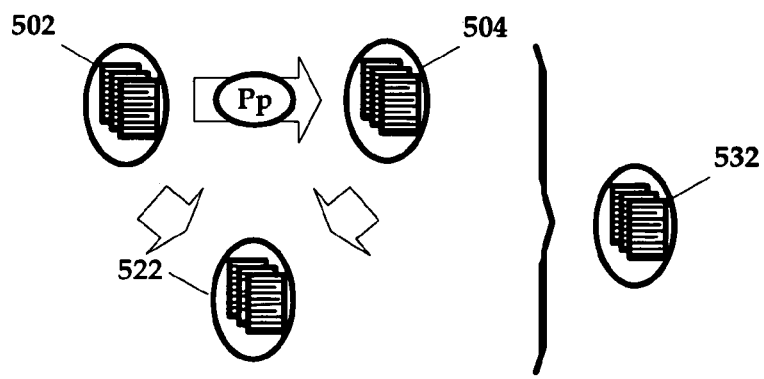

Referring now to FIG. 5A-FIG. 5B, the method 500 begins by improving (at 510) the continuity of the primary events in an original seismic dataset 502, to create a continuous seismic dataset 504. This will typically involve applying a primary correction ("$P_p$") to the original seismic dataset 502 to improve the continuity of primary reflections.

The discontinuities in the original seismic dataset will generally have been caused by anomalies related to changes in the subsurface over the acquisition time of the survey. In general, as was mentioned above, statics for primaries are known in the art and are typically a bulk shift of a seismic trace in time during seismic processing. A common static correction is the weathering correction, which compensates for a layer of low seismic velocity material near the surface of the Earth. Other corrections compensate for differences in topography and differences in the elevations of sources and receivers.

The present invention is intended for application to anomalies whose statics might be characterized as "temporal," as opposed to spatial. As those in the art having the benefit of this disclosure will appreciate, there are two time scales involved. First, there is the time during which the data is recorded, which is typically up to about 10 seconds after the shot is fired. This time roughly corresponds to the depth of the reflected energy. Then there is "acquisition time" which is the wall clock time that the shot is fired. From the point of view of statics, the wall clock time is essentially constant for each trace since the changes in the anomaly over the few seconds that the data are recorded is negligible.

The term "temporal" in this context refers to the acquisition time. Some statics are applied to anomalies that occur over periods of time longer than the acquisition time. For instance, the weathering static mentioned above occurs over a sufficiently long period of time that it typically remains largely unchanged for the whole of the acquisition period. However, changes in elevation—arising from shifting sand dunes, for example an readily occur during the acquisition. Examples in the context of a marine survey include tidal statics and water velocity corrections, which account for changes in tide and water velocity during acquisition. Thus, the present invention is typically suited for elevation statics, tidal statics, and water velocity correction, but relatively less so for weathering.

Note that the "acquisition time" is the time taken to acquire the data that is processed as a single entity. For four-dimensional ("4D") projects, it is becoming increasingly common to process two or more surveys together, and in particular the statics may be determined in common. For example, in "time-lapse" surveys for reservoir monitoring data is acquired in multiple surveys over many years—typically for the useful life of the reservoir. In such a case, the "acquisition time" is the span over which the data is acquired. The "acquisition time" therefore should cover all the surveys that may be processed as a single entity, which in practice means they have some geographical overlap even though they may be acquired years apart. Note that this implies that some statics may be "temporal" across the acquisition period for the entire data set such that they may be employed with the present invention even though they are not "temporal" for a single survey.

The exemplary statics mentioned above, i.e., elevation statics, tidal statics, and water velocity correction, apply to anomalies found in the near surface. Note that the anomaly does not have to be related to the near-surface, although it generally will be. From the point of view of the present invention, all that is important is that the continuity of the primaries can be improved by using the primary corrections, and that "multiple corrections" can be derived for at least first-order multiples. In practice, unless the anomaly is near the surface, then static corrections will not be appropriate, because some events will have reflected above the anomaly.

There is also generally an assumption that the energy travels almost vertically through the anomaly, and this assumption is best met near the surface.

The nature of the anomalies will be implementation specific, as may be inferred from the above discussion. One factor on which it depends is whether the survey by which the seismic data is acquired is a land-based survey or a marine survey. For instance, in the marine survey 100, shown in FIG. 1, exemplary statics might include what are known as tidal statics (i.e., changes in tide during acquisition) and water velocity corrections (i.e., changes in water velocity during acquisition). An exemplary static in the land-based survey 200 of FIG. 2 would be elevation statics. The probability of these three statics being applied in a single implementation is exceedingly low.

The present invention is intended for use with multiple prediction techniques (discussed more fully below) based on continuous primaries, i.e., that are consistent with a single underlying model. This is the case for almost all 3D multiple prediction techniques, including 3D SRME and 3D WEMA. Note that, although this disclosure describes the corrections as making the primaries continuous, they will not be perfectly continuous. As those in the art having the benefit of this disclosure will appreciate, perfectly continuous primaries are not achievable as a practical matter because of assumptions in the algorithms, errors in the tidal tables, etc. However, they will certainly be much more continuous than the raw seismic data. Furthermore, the primaries should be reasonably continuous in all directions. Improvement in continuity is typically more significant in the crossline direction of a survey than in the inline direction, because the statics do not vary rapidly in the inline direction. Thus, the method 500 first generates (at 510) a continuous seismic dataset 504.

Returning to FIG. 5A, the method 500 continues by predicting (at 520) the first order multiples 522 using the continuous seismic dataset 504. As was mentioned above, a large class of multiple prediction algorithms are known to the art for predicting multiples from primaries and lower-order multiples. Exemplary techniques include Surface Related Multiple Elimination ("SRME") and Wave Equation Multiple Attenuation ("WEMA"). Note that WEMA is used on for seismic data acquired through marine surveys. Both SRME and WEMA may be used on either 2D or 3D seismic data.

Four particular multiple prediction techniques are disclosed and claimed in the following references:

(1) U.S. application Ser. No. 10/668,927, filed Sep. 23, 2003, entitled "Method for the 3-D Prediction of Free-Surface Multiples," and published Mar. 24, 2005, ("the 927 application") which discloses a surface multiple predication ("SMP") technique;

(2) U.S. application Ser. No. 60/560,223, filed Apr. 7, 2004, entitled "Fast 3-D Surface Multiple Prediction," (Attorney Docket No. 594-25606) which discloses a fast surface multiple predication ("FSMP") technique;

(3) U.S. application Ser. No. 60/560,129, filed Apr. 7, 2004, entitled "Generalized 3-D Surface Multiple Prediction," (Attorney Docket No. 594-25608) which discloses a generalized surface multiple predication ("GSMP") technique; and (4) Wiggins, J. W, 1988, Attenuation of complex water-bottom multiples by wave-equation-based prediction and subtraction, Geophysics, 53, 1627-1539, which teaches a WEMA technique.

These references are hereby incorporated by reference as if set forth verbatim herein. However, any suitable technique for predicting multiples known to the art may be used.

The method 500 then continues by deterministically matching (at 530) the predicted multiples 522 and one of the original seismic dataset 502 or the continuous seismic dataset 504. The matching process depends on the datasets being matched, and in general involves applying corrections derived from the primary correction, $P_p$, to one or both of the datasets being matched. The difference can then be taken (at 540) between the matched datasets, to yield a difference dataset 532.

Figure 6A:
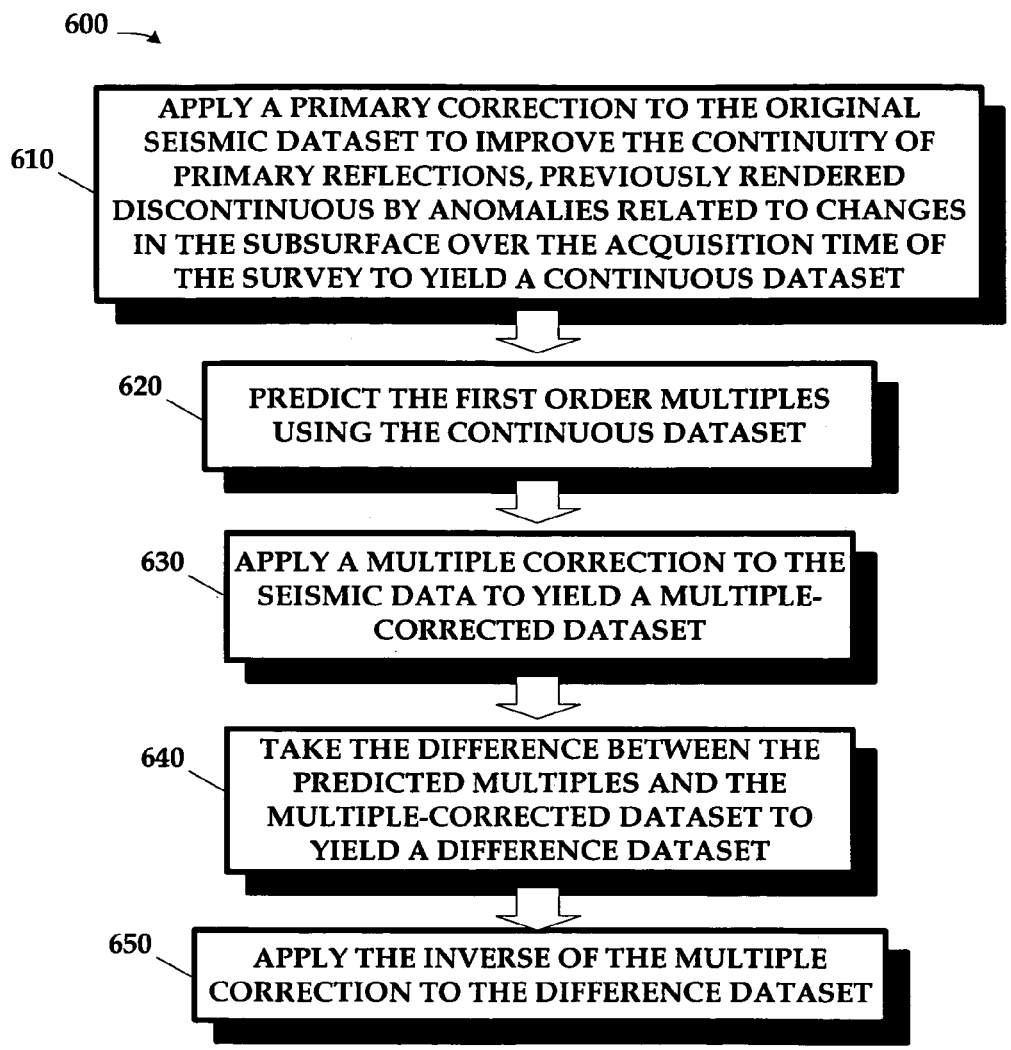
FIG. 6A-FIG. 6B show one particular embodiment of the method shown in FIG. 5A-FIG. 5B.
Figure 6B:
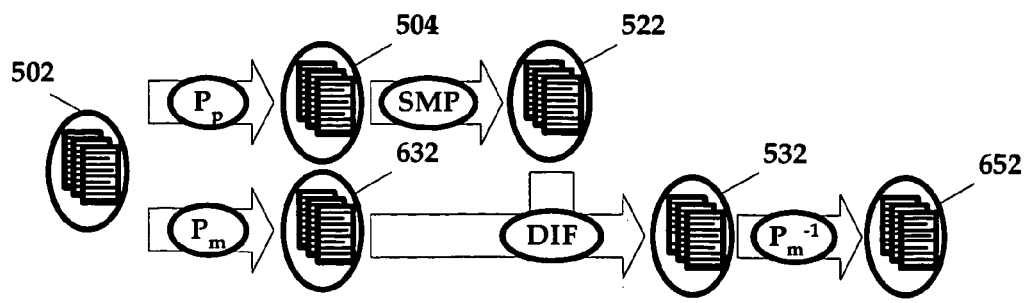

For instance, in one particular embodiment illustrated in FIG. 6A-FIG. 6B, a method 600 begins by applying (at 610) a primary correction to the original seismic dataset 502 to improve the continuity of primary reflections, previously rendered discontinuous by anomalies related to changes in the subsurface over the acquisition time of the survey to yield a continuous dataset 504. The method 600 then predicts (at 620) the first order multiples 522 using the continuous dataset 506 using, for example, SMP. Next, the method 600 applies (at 630) a multiple correction $P_m$ to the seismic data 502 to yield a multiple-corrected dataset 632. The method 600 then takes (at 640) the difference between the predicted multiples 522 and the multiple-corrected dataset 632 to yield a difference dataset 532. The method 600 then applies (at 650) the inverse ("$P_m^{-1}$") of the multiple correction to the difference dataset 532.

Figure 7A:
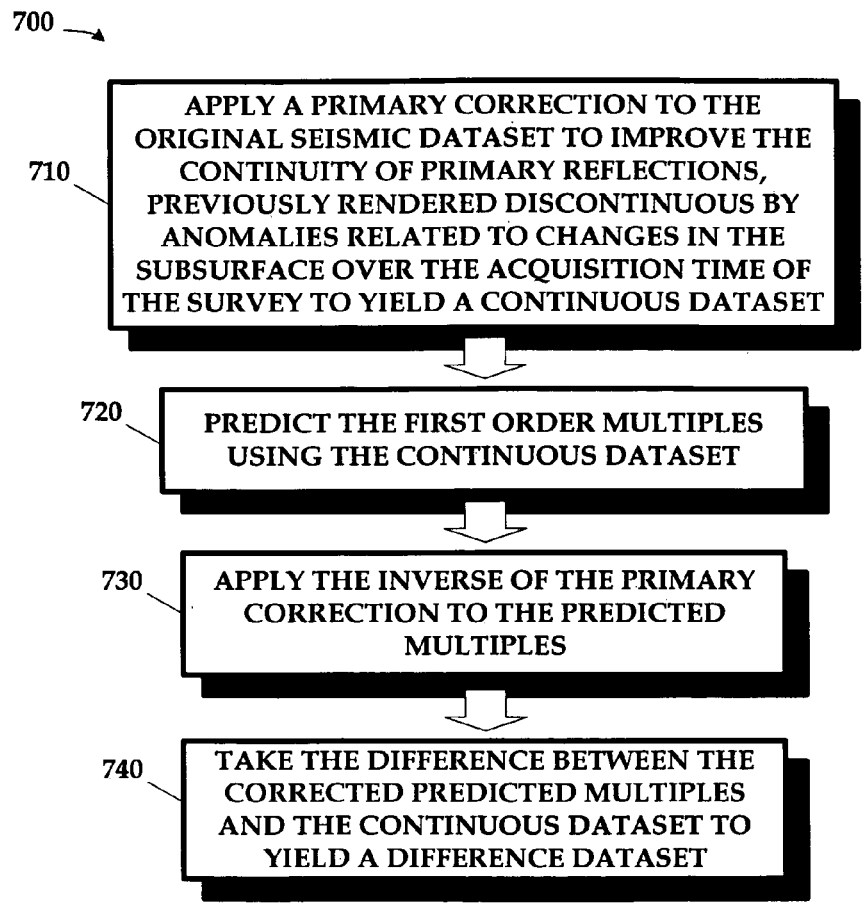
FIG. 7A-FIG. 7B show a second particular embodiment of the method shown in FIG. 5A-FIG. 5B.
Figure 7B:
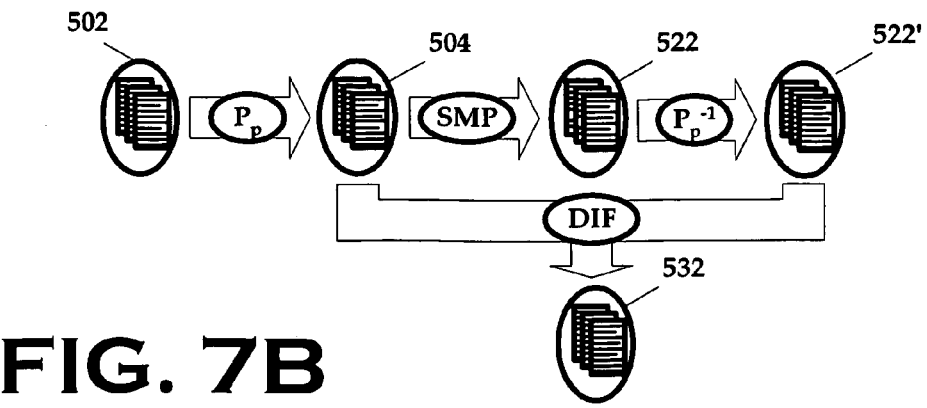

As another example, a second particular embodiment is illustrated in FIG. 7A-FIG. 7B. This particular embodiment includes a method 700 for use in processing seismic data that begins by applying (at 710) a primary correction $P_p$ to the original seismic dataset 502 to improve the continuity of primary reflections, previously rendered discontinuous by anomalies related to changes in the subsurface over the acquisition time of the survey to yield a continuous dataset 504. The method 700 next predicts (at 720) the first order multiples using the continuous dataset 504 using, for example SMP, to produce a set of predicted multiples 522. The method 700 then applies (at 730) the inverse $P_p^{-1}$ of the primary correction $P_p$ to the predicted multiples 522 to yield corrected predicted multiples 522'. The method 700 then takes (at 740) the difference between the predicted multiples 522 and the primary-corrected dataset 504 to yield a difference dataset 532.

To further an understanding of the present invention, the embodiments of FIG. 6A-FIG. 6B and FIG. 7A-FIG. 7B will now be disclosed in greater detail. These particular embodiments are intended for use on 3D data acquired in a marine seismic survey, although this is not necessary to the practice of the invention. In accordance with conventional practice, the seismic data set 502 is therefore organized by subsurface line ("SSL") and trace. That is, the seismic dataset 502 is comprises a plurality of traces grouped by the subsurface line through which they were acquired. Furthermore, in these particular embodiments, the static being applied is a tidal static.

Figure 8:
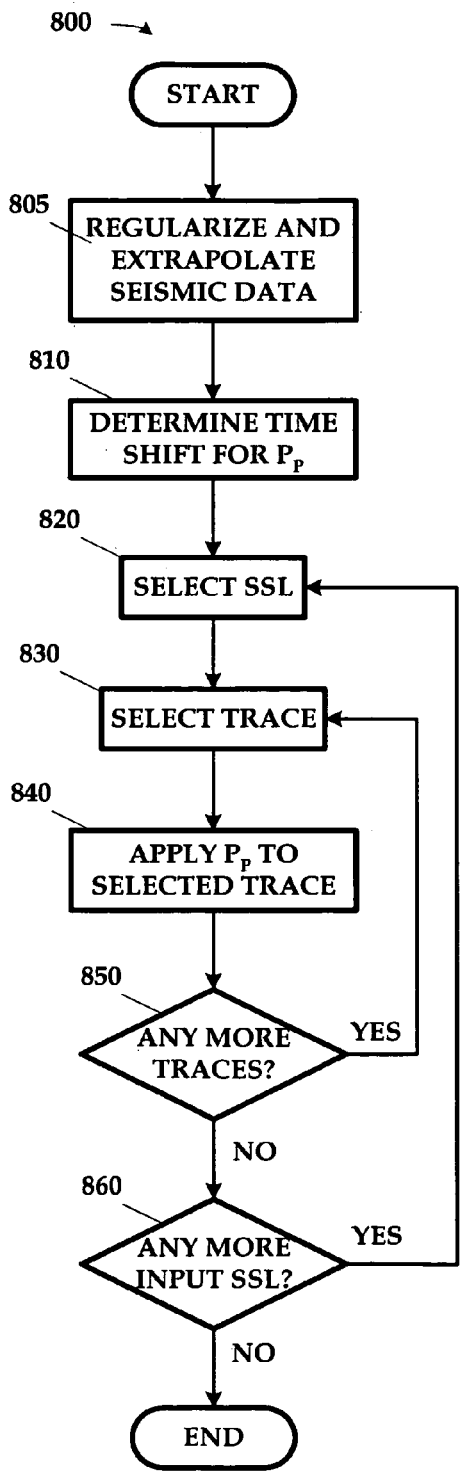
FIG. 8 charts the process of applying a primary correction to an input seismic dataset such as a dataset acquired by the surveys of FIG. 1 and FIG. 2.

Both of the methods 600, 700 begin by applying (at 610, 710) a primary correction $P_p$. As was mentioned above, a static is typically a bulk shift of a seismic trace in time. A method 800 for applying (at 610, 710) the primary correction $P_p$ is illustrated in FIG. 8, and begins by first preconditioning (at 805) the record of the original seismic dataset 502. That is, the record of seismic data is separated into subsurface lines ("SSLs") and each SSL is regularized according to conventional regularization methods known by persons of ordinary skill in the art. Note that not all embodiments will pre-condition the original seismic dataset 502 depending on the prediction technique employed. Some embodiments may omit pre-conditioning (at 805) entirely.

Once regularized, the crossline offset between each source and receiver is zero and the inline offset between each source and receiver is regular. Once the record of seismic data has been regularized to subsurface lines, the regularized data are extrapolated according to conventional extrapolation methods known by persons of ordinary skill in the art. Once extrapolated, the gap between each source and the receiver nearest to the source on each SSL is filled with extrapolated receivers. As a result, each SSL has traces with zero crossline offset and regularly increasing inline offsets starting from zero.

The method 800 then determines (at 810) the time shift, or "static", for the primary correction $P_p$. As mentioned above, the primary correction is typically a bulk shift, i.e., a timing correction applied to seismic dataset 502 line-by-line. However, statics do vary along the line. The correction is not necessarily constant within an SSL and it may vary with offset as well. Also, although statics are normally bulk time shifts, they are sometimes applied in a time-variant fashion (i.e., they vary slowly over the 10 seconds or so that the data are recorded over). The present invention is also applicable to these situations.

Thus, the method 800 then selects an SSL (at 820) and a trace from the SSL (at 830) and applies the primary correction $P_p$ (at 840). The method 800 iterates (at 850) the selection and correction until there are no more traces. The method 800 then selects the next SSL (at 820) and iterates through the process until (at 860) there are no more SSLs. When there are no more SSLs, then the primary factor $P_p$ has been applied to the seismic dataset 502.

Both the method 600 and the method 700 follow application of the primary correction $P_p$ (at 610, 710) with a multiple prediction (at 620, 720). Both embodiments may employ the same multiple prediction technique, and several candidates are mentioned above. However, to illustrate the diversity with which the invention may be implemented, the methods 600, 700 will be illustrated using separate multiple prediction techniques. More particularly, the methods 600, 700 will be disclosed using the first and second embodiments, respectively, of the 3D SMP technique disclosed in the '927 application incorporated by reference above. Consequently, the discussion will now focus on the illustrated embodiment of the method 600 through its termination followed a discussion of the rest of the method 700.

Figure 9A:
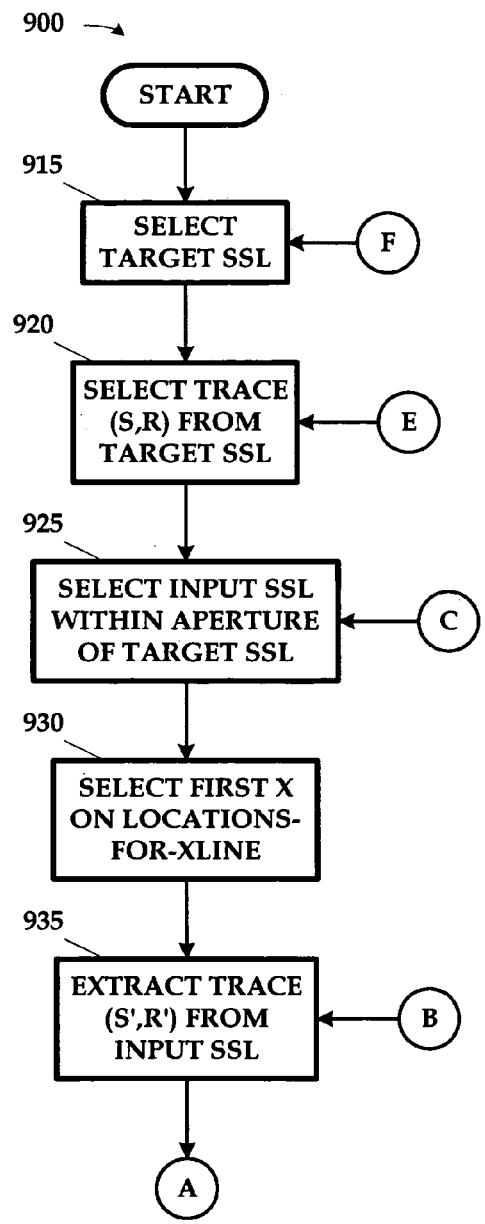
FIG. 9A-FIG. 9C illustrate one particular surface multiples prediction technique as may be used in some embodiments of the present invention, including the embodiment of FIG. 6A-FIG. 6B.
Figures 9B, 9C:
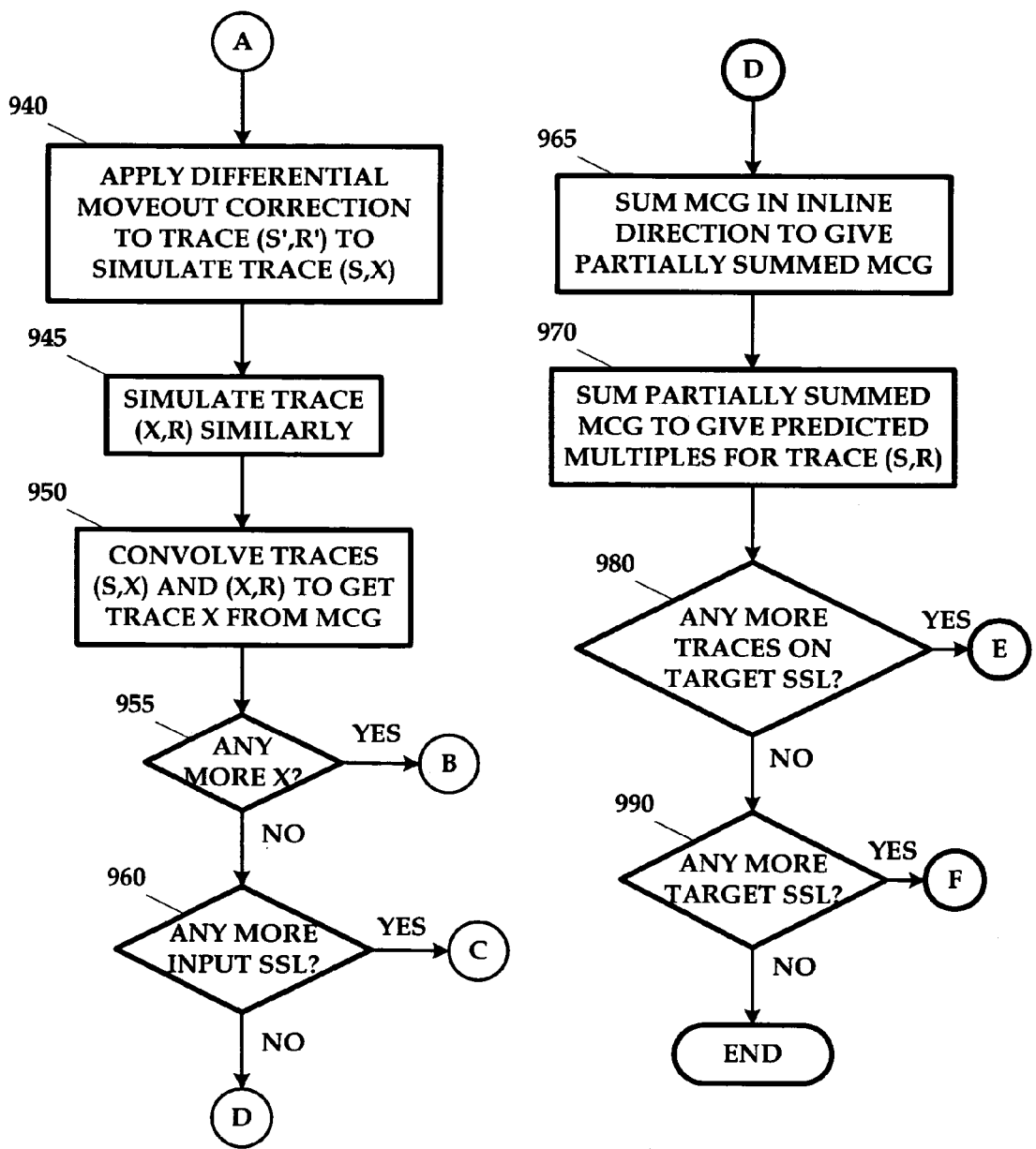

FIG. 9A-FIG. 9C illustrates a method 900 for predicting surface multiples from a record of seismic data in accordance with one embodiment of the invention. Note that the seismic dataset 502 is preconditioned (at 805, FIG. 8) prior to application of the primary correction (see the method 800, FIG. 8). Thus, the seismic dataset 502 has already been preconditioned at the time of the multiple prediction.

A target SSL 1010 is selected (at 915, FIG. 9A). The target SSL 1010 is defined as the locations of the traces for which the surface multiples are to be predicted. For purposes of illustrating embodiments of the invention, a specific trace on the target SSL for which the surface multiples are to be predicted has a source at S and a receiver at R, and is illustrated as trace (S, R) in FIG. 10. The trace (S, R) is selected (at 920, FIG. 9A) from the target SSL 1010.

Another SSL 1020 (hereinafter referred to as "input SSL") within a specified crossline aperture 1030 of the target SSL 1010 is selected (at 925, FIG. 9A). The aperture 1030 is generally specified by a maximum distance from the target SSL 1010, which is generally positioned in the middle of the aperture 1030. The aperture 1030 generally consists of many potential input SSLs, one of which is the target SSL 1010. As such, any input SSL within the aperture 1030 may be selected (at 925, FIG. 9A), since eventually every input SSL within the aperture 1030 will be processed. The term "aperture" is used herein in relation to the location of the input SSL 1020 and to the location of potential downward reflection points relative to the target SSL 1010. It should be noted, however, that the crossline distance from the target SSL 1010 to the potential downward reflection points is always twice that to the input SSL 1020, and hence, the crossline extent of the aperture 1030 defined in terms of potential downward reflection points is always twice that defined in terms of input SSL 1020.

The target SSL 1010 and the input SSL 1020 are separated by a distance y. In one embodiment, the distance y between the target SSL 1010 and the input SSL 1020 may be computed and may vary along the input SSL 1020 if it is not parallel to the target SSL 1010. A point X on a locations-for-X line 1040 is then selected (at 930, FIG. 9A). The point X corresponds to a potential downward reflection point for the surface multiples of trace (S,R). The locations-for-X line 1040 is defined to be a distance of 2 y from the target SSL 1010.

A trace on the input SSL 1020 that corresponds to trace (S,X) (a potential trace) is identified or extracted (at 935, FIG. 9A). For purposes of illustrating embodiments of the invention that trace is referred to as trace (S',R'). Trace (S',R') corresponds to trace (S,X) because S' and S have the same inline location, R' and X have the same inline location and trace (S',R') has the same inline offset as trace (S,X) but zero crossline offset. Further, the midpoints of traces (S,X) and (S',R') are at the same location M. In another embodiment, the trace on input SSL 1020 that has the closest actual offset to the offset of trace (S,X) and the same midpoint as trace (S,X) is extracted.

A differential moveout correction is applied (at 940, FIG. 9B) to trace (S',R') to simulate the trace (S,X). The differential moveout correction compensates for the difference in offset between the two traces, where the offset of a trace is defined to be the horizontal distance from the source to the receiver. The differential moveout correction is used here since traces (S,X) and (S',R') have the same midpoint location M.

By applying the differential moveout correction, the source at location S' on the input SSL 1020 is transferred to location S on the target SSL 1010 and the receiver at location R' on the input SSL 1020 is transferred to location X on the locations-for-X line 1040. In one embodiment, the differential moveout correction is a differential normal moveout ("NMO"). Other differential moveout correction algorithms are also contemplated by embodiments of the invention. In another embodiment, a velocity model, e.g., stacking velocity model, is used in connection with the differential moveout correction. The stacking velocity model may include inline stacking velocities or crossline stacking velocities.

Once the trace (S,X) has been simulated, the trace extraction (at 935, FIG. 9A) and differential moveout application (at 940, FIG. 9B) are iterated (at 945, FIG. 9B) to simulate a trace having a source located at X and a receiver located at R (hereinafter referred to as trace (X,R)). Trace (X,R) is simulated (at 945, FIG. 9B) by extracting a trace that corresponds to trace (X,R) from the input SSL 1020 and applying the differential moveout correction to that trace.

Once trace (S,X) and trace (X,R) have been simulated, the two traces are convolved to create a potential surface multiple trace for trace (S,R) corresponding to the downward reflection point X (at 950, FIG. 9B). This trace constitutes one trace from the multiple contribution gather ("MCG") for trace (S,R). The MCG is generally defined as the set potential surface multiples for trace (S,R) corresponding to all potential downward reflection points in the aperture. Trace (S,X) and trace (X,R) may be convolved by any conventional methods generally known by persons of ordinary skill in the art.

A determination is made (at 955, FIG. 9B) as to whether another point (e.g., $X_2$) corresponding to a potential downward reflection point exists on the location-for-X line 1040. If the answer is in the affirmative, processing returns to trace extraction (at 935, FIG. 9A) where a trace that corresponds to trace $(S,X_2)$ is identified on the input SSL 1020. The process described above (i.e., at 935, FIG. 9A-950, at FIG. 9B) are repeated until all potential downward reflection points on the locations-for-X line 1040 have been processed. Thereafter (at 955, FIG. 9B), an inline of potential surface multiples for trace (S,R) corresponding to all potential downward reflection points on the locations-for-X line is created in the MCG.

A determination is then made (at 960, FIG. 9B) as to whether another input SSL (e.g., input SSL 1050) exists within the aperture 1000. If the answer is in the affirmative, then processing returns to input SSL selection (at 925, FIG. 9A) after which a point X on another locations-for-X line (e.g., locations-for-X line 1060) is selected. The input SSL 1050 is separated from the target SSL 1010 by another distance, e.g., $y_2$, and the locations-for-X line 1060 is separated from the target SSL 1010 by a distance of 2 $y_2$. At the end of this process (at 955, FIG. 9B) for the input SSL 1050, another inline of potential surface multiples for trace (S,R) is created in the MCG. The above process (i.e., 925, FIG. 9A-955, FIG. 9B) is repeated until all the input SSLs within the aperture 1030 have been processed. The MCG is then filled (at 960, FIG. 9B) with inlines of potential surface multiples for trace (S,R) corresponding to all potential downward reflection points within the aperture 1030.

The traces in each inline from the MCG are then added (i.e., "stacked"; at 965, FIG. 9C) to generate a series of inline-summed traces. In this manner, the MCG has been partially summed. The inline-summed traces are then added (i.e., stacked; at 970, FIG. 9C) to generate a trace of actual surface multiples for trace (S,R). In this manner, the surface multiples for trace (S,R) have been three dimensionally predicted. The surface multiple prediction described herein is three dimensional since the aperture 1030 for the MCG spans an area of locations on the surface, as opposed to being restricted to a single SSL corresponding to the target SSL, as in a 2D surface multiple prediction. In one embodiment, the traces in each inline from the MCG are stacked to generate a series of inline-summed traces and the series of inline-summed traces are then stacked to generate the trace of actual surface multiples for trace (S,R).

A determination is then made (at 980, FIG. 9C) as to whether another trace (e.g., trace $(S_2,R_2)$) on the target SSL 1010 exists. If the answer is in the affirmative, then processing returns to select (at 920, FIG. 9B) another trace from the target SSL 1010. This processing (i.e., 925, at FIG. 9A-980, at FIG. 9C) are repeated until the actual surface multiples for each trace on target SSL 1010 are predicted. If the answer is in the negative, then processing proceeds.

A determination is made (at 990, FIG. 9C) as to whether another target SSL exists in the preconditioned record of seismic data. If the answer is in the affirmative, then processing returns to trace SSL selection (at 915, FIG. 9A). The process described above (i.e., 920, FIG. 9A-990, FIG. 9C) is repeated until the surface multiples for every trace in the record of seismic data are predicted. In this manner, the surface multiples for every trace in the record of seismic data are three dimensionally predicted.

Figure 11:
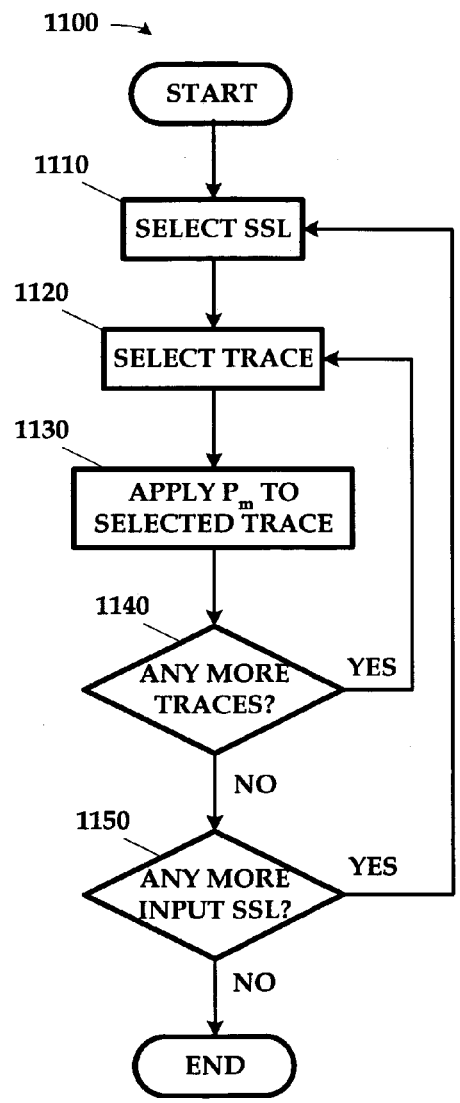
FIG. 11 illustrates applying the multiple correction on a line-by-line basis in the particular embodiment of FIG. 6A-FIG. 6B.

Returning to FIG. 6A, the method 600 then applies (at 630) a multiple correction $P_m$ to the original seismic dataset 502 to yield a multiple-corrected dataset 632. This correction is also performed on a line-by-line basis, as is shown in FIG. 11. Turning now to FIG. 11, a method 1100 is shown by which the difference may be taken. The method 1100 begins by selecting indices for an SSL (at 1110) and a trace (at 1120) and applies (at 1130) a multiple correction $P_m$ to the original seismic dataset 502. The method 1100 iterates through this process until there are no more traces (at 1140) and no more SSLs (at 1150), whereupon the result is the multiple-corrected dataset 632.

The method 600 then takes (at 640) the difference between the predicted multiples 522 and the multiple-corrected dataset 632 to yield a difference dataset 532. Taking the difference can be performed using a subtraction, e.g., an adaptive subtraction, although other embodiments may employ other techniques. This difference may also be taken on a line-by-line basis, as is shown in FIG. 12. Turning now to FIG. 12, a method 1200 is shown by which the difference may be taken. Both the predicted multiples 522 and the multiple-corrected dataset 632 comprise corresponding pluralities of traces grouped by subsurface line and therefore can be indexed the same. The method 1200 begins by selecting indices for an SSL (at 1210) and a trace (at 1220) and takes the difference (at 1230) between the predicted multiples 522 and the multiple-corrected dataset 632. The method 1200 iterates through this process until there are no more traces (at 1240) and no more SSLs (at 1250), whereupon the result is the difference dataset 642. Note that alternative embodiments may employ other forms of subtraction, e.g., adaptive subtraction, that are not performed on a line-by-line basis.

Returning again to FIG. 6A, the method 600 then applies (at 650) the inverse ("$P_m^{-1}$") of the multiple correction $P_m$ to the difference dataset 532 to yield a corrected difference dataset 652. Again, the inverse multiple correction $P_m^{-1}$ is applied on a line-by-line basis. The method 1300, shown in FIG. 13, begins by selecting an SSL (at 1310) and a trace (at 1320) and applies (at 1330) the inverse multiple correction $P_m^{-1}$ to the difference dataset 532. The method 1300 iterates through this process until there are no more traces (at 1340) and no more SSLs (at 1350).

Figure 14A:
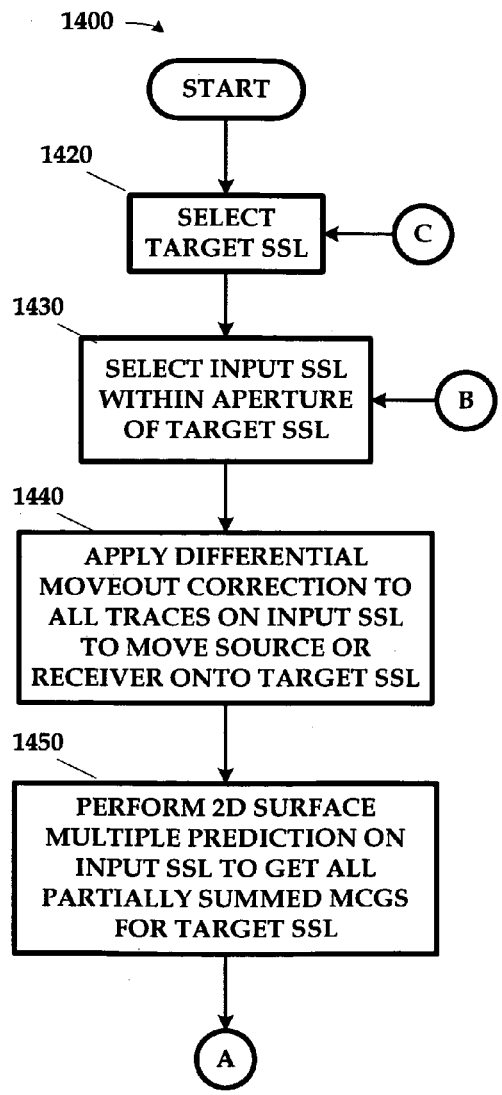
FIG. 14A-FIG. 14B illustrate one particular surface multiples prediction technique as may be used in some embodiments of the present invention, including the embodiment of FIG. 7A-FIG. 7B.
Figure 14B:
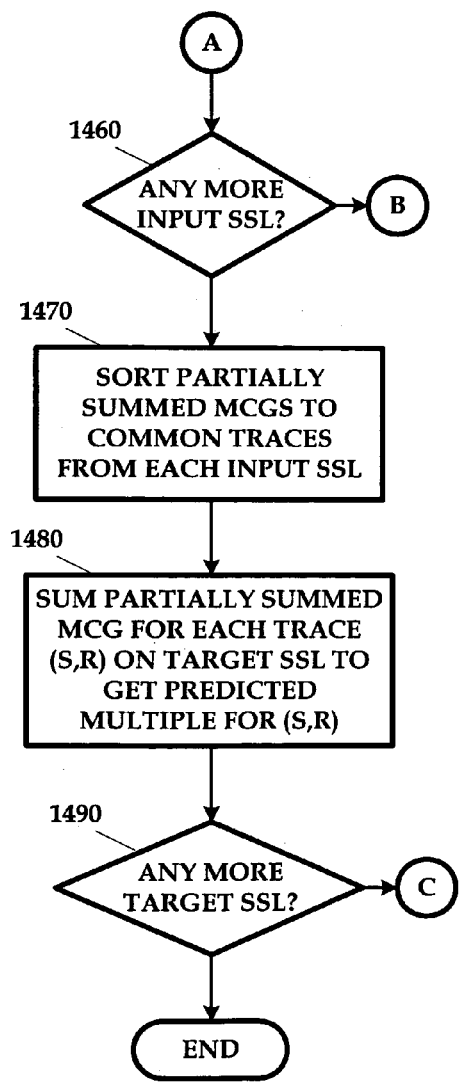

Returning now to FIG. 7A, the method 700 then predicts (at 720) the first order multiples using the primary corrected dataset 504. FIG. 14A-FIG. 14C illustrate a method 1400 for predicting surface multiples from a record of seismic data in accordance with another embodiment of the invention. The method 1400 next parallels the start of the method 900, shown in FIG. 9A-FIG. 9C. That is, a target SSL 1010 is selected (at 1420, FIG. 14A). The target SSL 1010 is defined as the location of the traces for which the surface multiples are to be predicted. In one embodiment, target SSL 1010 is one of the SSLs that have been preconditioned. The input SSL 1020 within the aperture 1030 of the target SSL 1010 is then selected (at 1430, FIG. 14A).

A differential moveout correction is applied (at 1440, at FIG. 14A) to every trace on the input SSL 1020, thereby changing the crossline offset of each trace to a distance of 2 y, where y is the distance between the input SSL 1020 and the target SSL 1010, and leaving the inline offset and the midpoint M unchanged. The differential moveout correction may be applied prior to selecting the trace (S,R) from the target SSL 1010 because the correction from trace (S',R') to trace (S,X) depends only on the source location S', the receiver location R' and the distance between the input SSL 1020 and the target SSL 1010, which is y. In one embodiment, the differential moveout correction is a differential normal moveout ("NMO"). Other differential moveout correction algorithms are also contemplated by embodiments of the invention. In another embodiment, a velocity model, e.g., stacking velocity model, is used in connection with the differential moveout correction. The stacking velocity model may include inline stacking velocities or crossline stacking velocities.

A two-dimensional ("2D") surface multiple prediction is then performed (at 1450, FIG. 14A) on the input SSL 1020 to generate a sum of all potential surface multiples on an inline (corresponding to input SSL 1020) in every MCG that corresponds to target SSL 1010. In this manner, every MCG that corresponds to target SSL 1010 has been partially computed and summed in the inline direction corresponding to input SSL 1020. The method 1400 then performs (at 1450, FIG. 14A) the operations the 2D surface multiple prediction (i.e., at 920, 930, 935, 950, 955, 965 and 980, FIG. 9A-FIG. 9C).

The 2D surface multiple prediction (at 1450, FIG. 14A) may be performed using existing code and algorithms generally known by persons of ordinary skill in the art, with only minor modifications, if any. In this manner, a portion of the 3D surface multiple prediction may be computed using existing 2D surface multiple prediction algorithms applied to data from a single SSL, thereby making the process very efficient. Existing 2D surface multiple prediction algorithms generally include a geometric spreading compensation correction to condition the data for a 2D surface multiple prediction, and a rho-filter appropriate to a 2D summation of the MCGs. Accordingly, in one embodiment of the invention, the geometric spreading correction is not applied, and the rho-filter is replaced with one configured for a 3D surface multiple prediction.

Figure 10:
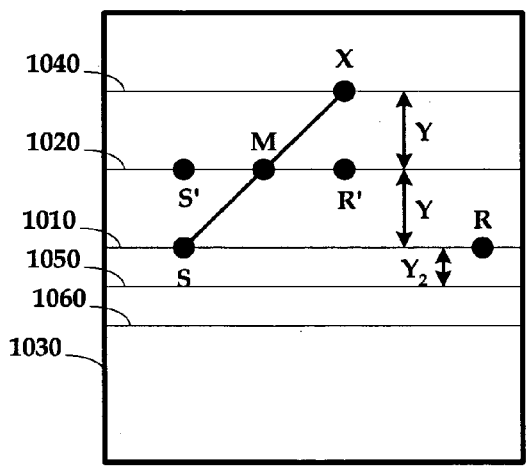
FIG. 10 illustrates some concepts associated with the illustrated embodiments of the present invention.

A determination is then made (at 1460, FIG. 14B) as to whether another input SSL (e.g., input SSL 1050) exists within the aperture 1000, shown in FIG. 10. If the answer is in the affirmative, then processing returns to selection of another input SSL (at 1430, FIG. 14A). Thereafter, for input SSL 1050, the inline sums of all potential surface multiples on another inline (corresponding to the input SSL 1050) in every MCG corresponding to target SSL 1010 will have been computed. This process (i.e., 1440-1450, FIG. 14A) is repeated until all the input SSLs within the aperture 1030 have been processed. Thus, at this point (the end of 1460, FIG. 14B), a series of sums of all potential surface multiples on every inline in every MCG corresponding to target SSL 1010 has been generated. That is, for every trace on target SSL 1010, the inline sums in the MCG for that trace have been computed for each inline within the aperture 1030.

The partially-summed surface multiple traces from all input SSLs are then combined and sorted (at 1470, FIG. 14B) by trace order, such that all the partially summed traces (i.e., all the inline sums) corresponding to a given trace (S,R) on the target SSL 1010 are adjacent to each other. The set of partially summed traces for a given trace (S,R) on the target SSL 1010 constitutes a "crossline MCG," which is not the same as a crossline from the MCG since the crossline MCG consists of traces after summation in the inline direction. The traces in each crossline MCG are summed (at 1480, FIG. 14B) to generate the actual surface multiples for each trace on target SSL 1010.

In one embodiment, if the record of seismic data is irregular in the crossline direction (i.e., y varies along the line because the input and target SSLs are not parallel), then the traces in the crossline MCG will not be regularly spaced either. In this case, it may be necessary to regularize the crossline MCG before it can be summed. In another embodiment, if the trace spacings between input SSLs are too large, then the MCGs may be aliased according to conventional aliasing criteria known by persons of ordinary skill in the art. In this case, the input SSLs may be interpolated to have a finer trace spacing before stacking. Alternatively, the record of seismic data may be interpolated to simulate SSLs between the SSLs that were actually recorded.

A determination is then made (at 1490, FIG. 14B) as to whether another target SSL exists in the preconditioned record of seismic data. If the answer is in the affirmative, then another target SSL is selected (at 1420, FIG. 14A). The processing iterates (at 1430, FIG. 14A-1490, FIG. 14B) until the surface multiples for every trace in the record of seismic data are predicted. In this manner, the surface multiples for every trace in the record of seismic data are three dimensionally predicted.

Figure 15:
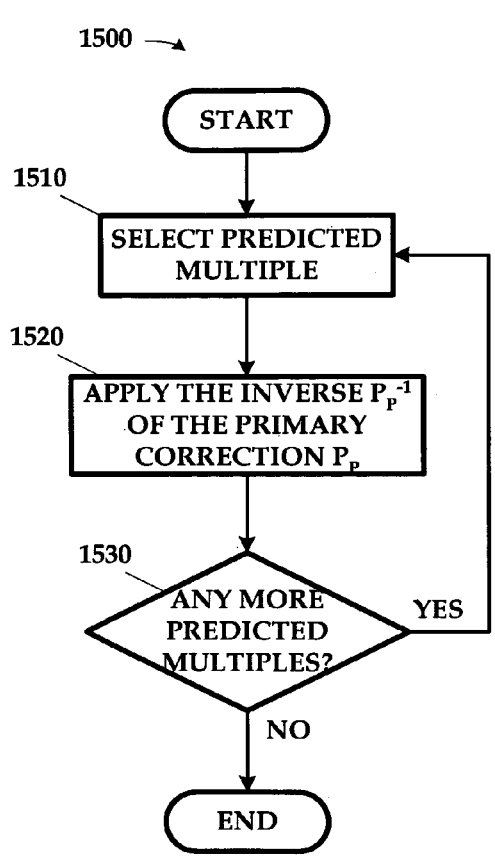
FIG. 15 illustrates a method by which the embodiment of FIG. 7A-FIG. 7B applies the inverse of the primary correction to the predicted multiples.

Returning now to FIG. 7A, the method 700 then applies (at 730) the inverse $P_p^{-1}$ of the primary correction Pp to the predicted multiples 522 to yield corrected predicted multiples 522'. FIG. 15 illustrates the method 1500 by which this is done in this particular embodiment. The method 1500 begins by selecting (at 1510) a predicted multiple and applying (at 1520) the inverse $P_p^{-1}$ of the primary correction $P_p$. This process iterates until (at 1530) there are no more predicted multiples, whereupon the method 1500 terminates.

Figure 16:
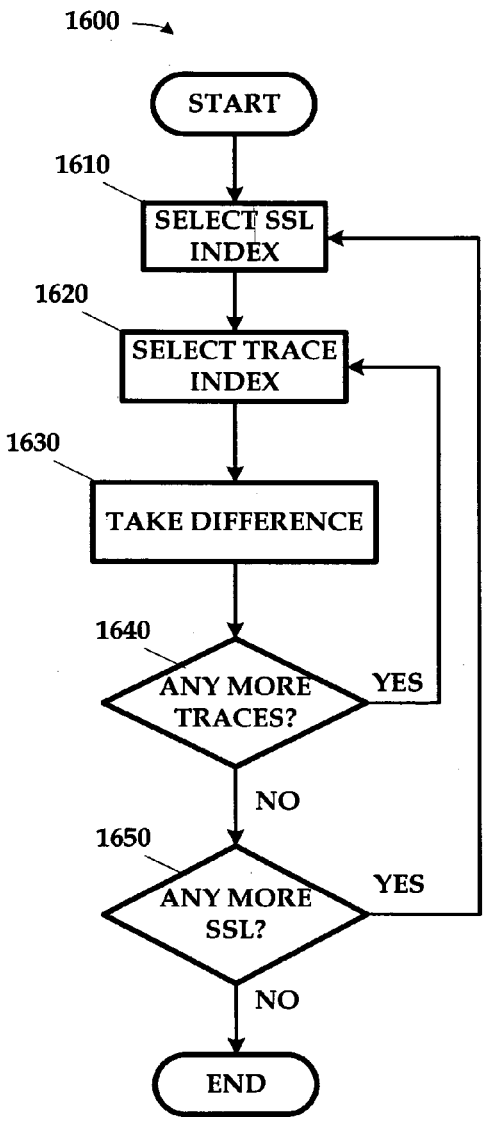
FIG. 16 illustrates taking the difference on a line-by-line basis in the particular embodiment of FIG. 7A-FIG. 7B.

Returning once again to FIG. 7A, the difference between the predicted multiples 522 and the primary-corrected dataset 504 to yield a difference dataset 532. FIG. 16 illustrates a method 1600 by which the difference may be taken. Both the corrected predicted multiples 522' and the continuous seismic dataset 504 comprise corresponding pluralities of traces grouped by subsurface line and therefore can be indexed the same. The method 1600 begins by selecting indices for an SSL (at 1610) and a trace (at 1620) and takes the difference (at 1630) between the corrected predicted multiples 522' and the continuous seismic dataset 504. The method 1600 iterates through this process until there are no more traces (at 1640) and no more SSLs (at 1650), whereupon the result is the difference dataset 532.

Thus, in general, for "static" corrections, the primary events should end up continuous in the crossline direction. This means that the crossline MCGs will be smooth, and will stack correctly, without noise. We should then match the predicted and actual multiple times as best we can deterministically before the subtraction, and allow the adaptive nature of the subtraction to handle any residual errors. It is easiest to arrange that the multiples match by applying a "multiple static" to the input data, rather than trying to correct the predicted multiples. The multiple static (for first-order multiples) can be designed in the same way as the primary static—that is, the multiple correction is derived from the primary correction (e.g., the water time is doubled in tidal statics).

Some portions of the detailed descriptions herein are consequently presented in terms of a software implemented process involving symbolic representations of operations on data bits within a memory in a computing system or a computing device. These descriptions and representations are the means used by those in the art to most effectively convey the substance of their work to others skilled in the art. The process and operation require physical manipulations of physical quantities. Usually, though not necessarily, these quantities take the form of electrical, magnetic, or optical signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantifies. Unless specifically stated or otherwise as may be apparent, throughout the present disclosure, these descriptions refer to the action and processes of an electronic device, that manipulates and transforms data represented as physical (electronic, magnetic, or optical) quantities within some electronic device's storage into other data similarly represented as physical quantities within the storage, or in transmission or display devices. Exemplary of the terms denoting such a description are, without limitation, the terms "processing," "computing," "calculating," "determining," "displaying," and the like.

Note also that the software implemented aspects of the invention are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The invention is not limited by these aspects of any given implementation.

This concludes the detailed description. The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A method for use in seismic data processing, comprising:
   improving the continuity of the primary events in an original seismic dataset to create a continuous seismic dataset;
   predicting at least the first order multiples of the original seismic dataset from the continuous seismic dataset;
   deterministically matching the predicted multiples and the original seismic dataset or the continuous seismic dataset; and
   taking the difference between the matched datasets.

2. The method of claim 1, farther comprising applying a multiple correction, an inverse of the multiple correction, or an inverse of a primary correction to the difference between the matched datasets, depending upon to which data set the corrections were applied.

3. The method of claim 1, wherein:
   deterministically matching includes applying a multiple correction to the original seismic dataset to yield a multiple-corrected dataset; and
   taking the difference between the matched datasets includes taking the difference between the multiple-corrected dataset and the predicted multiples.

4. The method of claim 3, further comprising applying an inverse of a multiple correction to the difference.

5. The method of claim 3, wherein taking the difference includes performing a subtraction.

6. The method of claim 5, wherein performing the subtraction includes performing an adaptive subtraction.

7. The method of claim 1, wherein:
   deterministically matching includes applying the inverse of a primary correction to the predicted multiples; and
   taking the difference between the matched datasets includes taking the difference between the corrected predicted multiples and the original dataset.

8. The method of claim 7, wherein taking the difference includes performing a subtraction.

9. The method of claim 8, wherein performing the subtraction includes performing an adaptive subtraction.

10. The method of claim 1, wherein improving the continuity of the primary events includes applying a primary correction to the original seismic dataset to improve the continuity of primary reflections previously rendered discontinuous by anomalies related to changes in the subsurface over the acquisition time of the survey.

11. The method of claim 10, wherein applying the primary correction includes applying a primary correction for one or more of tidal statics, water velocity correction, and elevation statics.

12. The method of claim 10, wherein applying the primary correction includes applying a primary correction for a near-surface anomaly.

13. The method of claim 1, wherein deterministically matching the datasets includes applying a correction derived from the primary correction to one or more of the original seismic dataset, the continuous seismic dataset, and the predicted multiples.

14. The method of claim 1, wherein taking the difference includes performing a subtraction.

15. The method of claim 14, wherein performing the subtraction includes performing an adaptive subtraction.

16. The method of claim 1, wherein the original seismic dataset is two-dimensional seismic data.

17. The method of claim 1, wherein the original seismic dataset is three-dimensional seismic data.

18. The method of claim 1, wherein the original seismic dataset is four-dimensional seismic data.

19. The method of claim 1, wherein the original seismic dataset is acquired from a marine survey.

20. The method of claim 1, wherein the original seismic dataset is acquired from a land-based survey.

21. A method for use in processing seismic data, comprising:
   applying a primary correction to the original seismic dataset to improve the continuity of primary reflections, previously rendered discontinuous by anomalies related to changes in the subsurface over the acquisition time of the survey to yield a continuous dataset;
   predicting the first order multiples using the continuous dataset,
   applying a multiple correction to the seismic data to yield a multiple-corrected dataset;
   taking the difference between the predicted multiples and the multiple-corrected dataset to yield a difference dataset; and
   applying the inverse of the multiple correction to the difference dataset.

22. The method of claim 21, wherein applying the primary correction includes applying a primary correction for one or more of tidal statics, water velocity correction, and elevation statics.

23. The method of claim 21, wherein applying the primary correction includes applying a primary correction for a near-surface anomaly.

24. The method of claim 21, wherein predicting the first order multiples includes predicting higher order multiples.

25. The method of claim 21, wherein taking the difference includes performing a subtraction.

26. The method of claim 25, wherein performing the subtraction includes performing an adaptive subtraction.

27. The method of claim 21, further comprising applying the primary correction to the dataset yielded by the application of the inverse of the multiple correction to the difference dataset.

28. A method for use in processing seismic data, comprising:
applying a primary correction to the original seismic dataset to improve the continuity of primary reflections, previously rendered discontinuous by anomalies related to changes in the subsurface over the acquisition time of the survey to yield a continuous dataset;
predicting the first order multiples using the continuous dataset,
applying the inverse of the primary correction to the predicted multiples; and
taking the difference between the corrected predicted multiples and the continuous dataset to yield a difference dataset.

29. The method of claim 28, further comprising applying the inverse of the primary correction to the difference dataset.

30. The method of claim 28, wherein applying the primary correction includes applying a primary correction for one or more of tidal statics, water velocity correction, and elevation statics.

31. The method of claim 28, wherein applying the primary correction includes applying a primary correction for a near-surface anomaly.

32. The method of claim 28, wherein predicting the first order multiples includes predicting higher order multiples.

33. The method of claim 28, wherein taking the difference includes performing a subtraction.

34. The method of claim 33, wherein performing the subtraction includes performing an adaptive subtraction.

35. A method for use in seismic data processing, comprising:
determining a primary correction for a given type of static anomaly; and
deriving a multiple correction from the same information used to derive the primary correction.

36. The method of claim 35, wherein determining the primary correction includes determining a primary correction for one or more of tidal statics, water velocity correction, and elevation statics.

37. The method of claim 35, wherein determining the primary correction includes determining a primary correction for a near-surface anomaly.

38. The method of claim 35, wherein deriving the multiple correction includes multiplying the primary correction by a predetermined factor.

39. The method of claim 38, wherein deriving the multiple correction includes doubling the primary correction.

40. The method of claim 38, wherein deriving the multiple correction includes multiplying the primary correction by the order of the multiple +1.

41. The method of claim 38, wherein deriving the multiple correction includes multiplying the primary correction by the twice the order of the multiple +1.

42. The method of claim 35, wherein deriving the multiple correction includes doubling the primary correction.

43. The method of claim 35, wherein deriving the multiple correction includes multiplying the primary correction by the order of the multiple +1.

44. The method of claim 35, wherein deriving the multiple correction includes multiplying the primary correction by the twice the order of the multiple +1.

* * * * *